United States Patent
Wighton et al.

(10) Patent No.: US 11,679,561 B2
(45) Date of Patent: Jun. 20, 2023

(54) TECHNIQUES FOR CONTAMINATION DETECTION IN ADDITIVE FABRICATION AND RELATED SYSTEMS AND METHODS

(71) Applicant: Formlabs, Inc., Somerville, MA (US)

(72) Inventors: Shane Wighton, Raleigh, NC (US); Andrew M. Goldman, Stow, MA (US); Henry Whitney, Weymouth, MA (US); Justin Keenan, Lexington, MA (US)

(73) Assignee: Formlabs, Inc., Somerville, MA (US)

( * ) Notice: Subject to any disclaimer, the term of this patent is extended or adjusted under 35 U.S.C. 154(b) by 399 days.

(21) Appl. No.: 16/811,567

(22) Filed: Mar. 6, 2020

(65) Prior Publication Data

US 2020/0282657 A1 Sep. 10, 2020

Related U.S. Application Data

(60) Provisional application No. 62/815,728, filed on Mar. 8, 2019.

(51) Int. Cl.
*B29C 64/393* (2017.01)
*B29C 64/245* (2017.01)
(Continued)

(52) U.S. Cl.
CPC .......... *B29C 64/393* (2017.08); *B29C 64/129* (2017.08); *B29C 64/236* (2017.08);
(Continued)

(58) Field of Classification Search
CPC ... B29C 64/129; B29C 64/135; B29C 64/236; B29C 64/245; B29C 64/268;
(Continued)

(56) References Cited

U.S. PATENT DOCUMENTS 8,040,530 B2 10/2011 Cooper
10,316,213 B1 6/2019 Arndt et al.
(Continued)

FOREIGN PATENT DOCUMENTS

NL 2018484 B2 2/2018
WO WO 2017/108762 A1 6/2017

OTHER PUBLICATIONS

PCT/US2020/021409, Jun. 23, 2020, International Search Report and Written Opinion.
(Continued)

*Primary Examiner* — Philip C Tucker
*Assistant Examiner* — Jimmy R Smith, Jr.
(74) *Attorney, Agent, or Firm* — Wolf, Greenfield & Sacks, P.C.

(57) ABSTRACT

According to some aspects, techniques are provided for identifying contamination in additive fabrication devices by measuring light interacting with the contamination using one or more light sensors. Contamination located between a light source and a target of a light source can affect the uniformity and intensity of the light source when incident upon the target. For instance, in an inverse stereolithography device, contamination located between a light source and a liquid photopolymer resin that is to be cured can affect the quality of the fabricated object when the light is scattered or blocked by the contamination. Identifying the presence of contamination between the light source and the liquid photopolymer resin and alerting the user prior to initiating a fabrication process may increase the quality of the resulting fabricated object and improve the user experience by saving time and photocurable liquid.

10 Claims, 12 Drawing Sheets

(51) Int. Cl.

| | | |
|---|---|---|
| *B29C 64/286* | (2017.01) | |
| *G01N 21/958* | (2006.01) | |
| *B33Y 50/00* | (2015.01) | |
| *G01N 21/94* | (2006.01) | |
| *B29C 64/386* | (2017.01) | |
| *B33Y 30/00* | (2015.01) | |
| *B33Y 50/02* | (2015.01) | |
| *B29C 64/236* | (2017.01) | |
| *B29C 64/129* | (2017.01) | |
| *B29C 64/268* | (2017.01) | |
| *B33Y 10/00* | (2015.01) | |

(52) U.S. Cl.
CPC .......... *B29C 64/245* (2017.08); *B29C 64/268* (2017.08); *B29C 64/286* (2017.08); *B29C 64/386* (2017.08); *B33Y 50/00* (2014.12); *G01N 21/94* (2013.01); *G01N 21/958* (2013.01); *B33Y 10/00* (2014.12); *B33Y 30/00* (2014.12); *B33Y 50/02* (2014.12); *G01N 2021/945* (2013.01)

(58) Field of Classification Search
CPC ..... B29C 64/286; B29C 64/393; B33Y 10/00; B33Y 30/00; B33Y 50/02; G01N 2021/945; G01N 21/94; G01N 21/958
See application file for complete search history.

(56) References Cited

U.S. PATENT DOCUMENTS

| | | | |
|---|---|---|---|
| 10,611,093 | B2 | 4/2020 | FrantzDale et al. |
| 11,186,044 | B2 | 11/2021 | FrantzDale et al. |
| 2002/0104973 | A1 | 8/2002 | Kerekes |
| 2006/0111807 | A1 | 5/2006 | Gothait et al. |
| 2012/0100031 | A1 | 4/2012 | Ljungblad |
| 2013/0292862 | A1 | 11/2013 | Joyce |
| 2014/0242717 | A1* | 8/2014 | Rochette ............ G01N 21/6486 422/69 |
| 2015/0004045 | A1 | 1/2015 | Ljungblad |
| 2015/0034007 | A1* | 2/2015 | Fischer ................. B29C 64/129 118/620 |
| 2015/0064298 | A1 | 3/2015 | Syao |
| 2015/0145171 | A1 | 5/2015 | Walker et al. |
| 2016/0023403 | A1 | 1/2016 | Ramos et al. |
| 2016/0046080 | A1 | 2/2016 | Thomas et al. |
| 2016/0054115 | A1 | 2/2016 | Snis |
| 2016/0136896 | A1 | 5/2016 | Wighton |
| 2016/0211116 | A1 | 7/2016 | Lock |
| 2017/0036398 | A1 | 2/2017 | Gumennik et al. |
| 2017/0057174 | A1 | 3/2017 | Megretski et al. |
| 2017/0197363 | A1 | 7/2017 | Frantzdale |
| 2017/0217103 | A1 | 8/2017 | Babaei et al. |
| 2017/0227418 | A1 | 8/2017 | Snis |
| 2017/0239752 | A1 | 8/2017 | Buller et al. |
| 2017/0355147 | A1* | 12/2017 | Buller ................... B29C 64/268 |
| 2017/0368747 | A1 | 12/2017 | Nolet et al. |
| 2019/0145907 | A1* | 5/2019 | Van Mechelen .......... G01J 1/02 356/239.1 |
| 2019/0210289 | A1 | 7/2019 | FrantzDale et al. |
| 2020/0215762 | A1 | 7/2020 | FrantzDale et al. |

OTHER PUBLICATIONS

International Search Report and Written Opinion for International Application No. PCT/US2018/12927 dated Mar. 29, 2018.
Xie et al., LIPS: A Light Intensity Based Positioning System for Indoor Environments. Mar. 7, 2014. 14 pages.
International Preliminary Report on Patentability for International Application No. PCT/US2018/12927, dated Jul. 23, 2020.
Extended European Search Report dated Jul. 9, 2021 in connection with European Application No. 18900224.9.
International Preliminary Report on Patentability dated Sep. 23, 2021 for International Application No. PCT/US2020/021409.
† U.S. Appl. No. 16/821,486, filed May 17, 2020, FrantzDale et al. PCT/US2018/12927, Mar. 29, 2018, International Search Report and Written Opinion.
International Search Report and Written Opinion for International Application No. PCT/US2020/021409, dated Jun. 23, 2020.

* cited by examiner

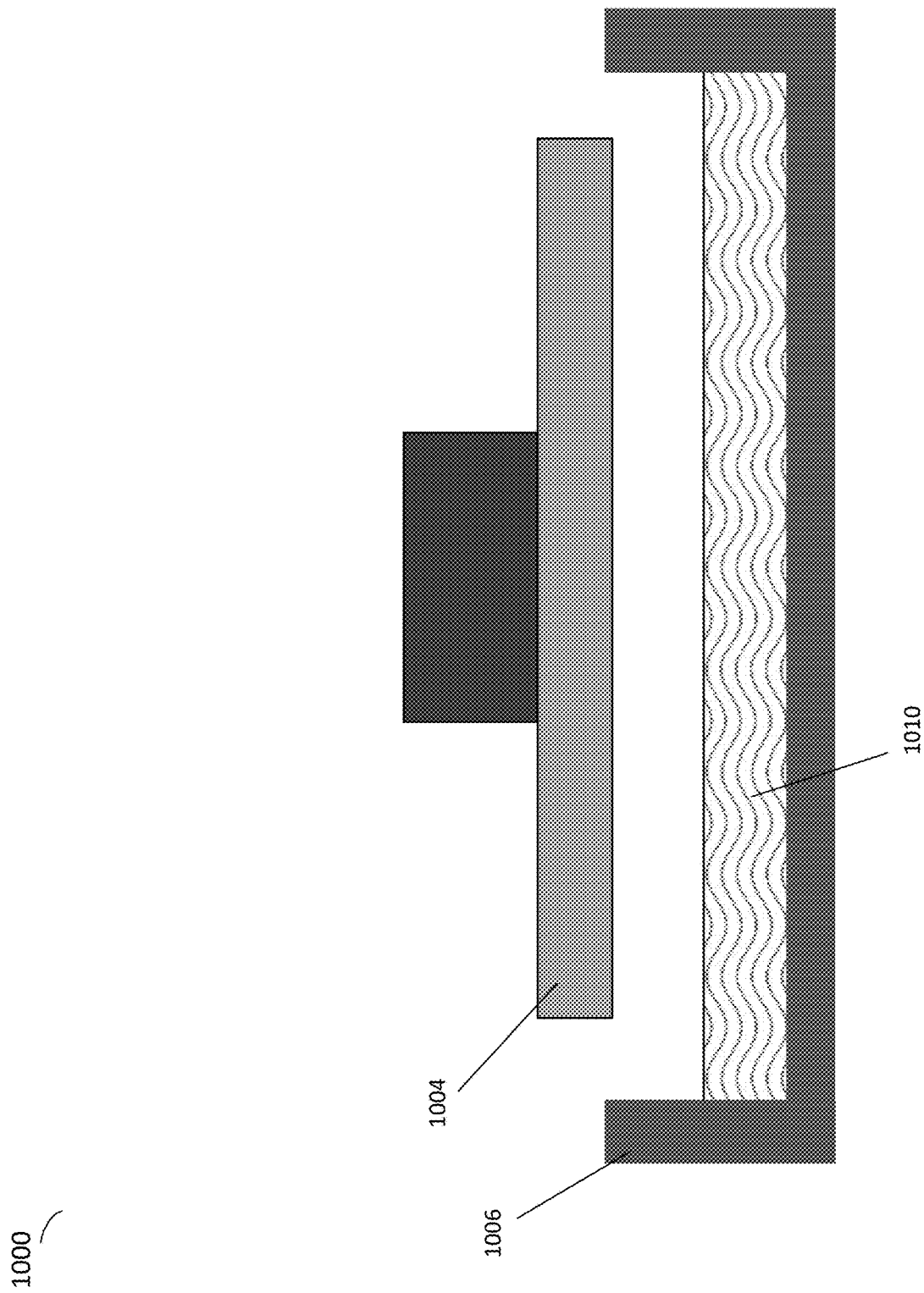

TECHNIQUES FOR CONTAMINATION DETECTION IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/815,728, filed Mar. 8, 2019, titled "Techniques For Contamination Detection In Additive Fabrication And Related Systems And Methods," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof.

Many additive fabrication techniques build parts by forming successive layers, which are typically cross-sections of the desired object. Typically each layer is formed such that it adheres to either a previously formed layer or a substrate upon which the object is built. In one approach to additive fabrication, known as stereolithography, solid objects are created by successively forming thin layers of a curable polymer resin, typically first onto a substrate and then one on top of another. Exposure to actinic radiation such as light cures a thin layer of liquid resin, which causes it to harden and adhere to previously cured layers and the bottom surface of the substrate.

SUMMARY

According to some aspects, a device is provided comprising an optical window, a light source below the optical window arranged to direct light towards the optical window, at least one light sensor below the optical window arranged to receive light emitted by the light source and reflected through the optical window, at least one processor, and at least one computer readable medium comprising instructions that, when executed by the at least one processor control the light source to direct light onto the optical window, and identify contamination on the optical window based at least in part on the light received by the at least one light sensor.

According to some embodiments, the instructions, when executed by the at least one processor, further identify contamination on the optical window based at least in part on a known calibration pattern.

According to some embodiments, the known calibration pattern comprises at least one light scattering area and at least one light absorbing area.

According to some embodiments, the light source is a laser.

According to some embodiments, the light sensor is a photodiode.

According to some embodiments, identifying contamination on the optical window based at least in part on the light received by the at least one light sensor comprises identifying contamination on the optical window based at least in part on a known calibration pattern, filtering out false indications of contamination based at least in part on the known calibration pattern, and categorizing contamination as scattering or absorptive based at least in part on the known calibration pattern.

According to some embodiments, the optical window is attached to a movable stage configured to move in a first direction below a container.

According to some embodiments, the instructions, when executed by the at least one processor, further move the movable stage along the first direction whilst operating at least one optical component to direct the light from the light source along a second direction perpendicular to the first direction, thereby scanning the light from the light source over a two-dimensional region.

According to some embodiments, the device further comprises a container disposed above the optical window.

According to some embodiments, the instructions, when executed by the at least one processor, further operate the at least one optical component to direct the light from the light source back and forth through a plurality of locations along a first direction and a second direction perpendicular to the first direction, thereby scanning the light over a two-dimensional area.

According to some embodiments, the device is an additive fabrication device configured to form layers of solid material on a build surface by directing light through the optical window onto a liquid photopolymer.

According to some embodiments, the additive fabrication device is configured to form the layers of solid material by directing light other than the light source through the optical window onto the liquid photopolymer.

According to some aspects, an additive fabrication device is provided configured to form layers of solid material on a build surface by directing light through an optical window, the additive fabrication device comprising an optical window, a light source below the optical window arranged to direct light towards the optical window, at least one light sensor below the optical window arranged to receive light emitted by the light source and reflected through the optical window, at least one processor, and at least one computer readable medium comprising instructions that, when executed by the at least one processor control the light source to direct light onto the optical window, detect a failure mode of the additive fabrication device based at least in part on the light received by the at least one light sensor.

According to some embodiments, the instructions, when executed by the at least one processor, further terminate the additive fabrication process upon detection of a failure mode of the additive fabrication device.

According to some embodiments, the instructions, when executed by the at least one processor, further modify instructions of the additive fabrication device based on the at least one signal from the at least one light sensor.

According to some embodiments, the light source is a laser.

According to some embodiments, the additive fabrication device further comprises at least one mirror galvanometer arranged to direct the light from the light source through any of a plurality of locations.

According to some embodiments, the optical window is attached to a movable stage configured to move in a first direction.

According to some embodiments, the instructions, when executed by the at least one processor, further move the movable stage along the first direction whilst operating the at least one optical component to direct the light from the light source back and forth through any of a plurality of locations along a second direction perpendicular to the first direction, thereby scanning the light over a two-dimensional region.

According to some embodiments, the additive fabrication device further comprises a container disposed above the optical window.

According to some aspects, at least one non-transitory computer readable medium comprising instructions that, when executed, causes a device to perform a method of operating at least one light source disposed below an optical window, obtaining, from at least one light sensor, at least one detected light intensity in response to operation of the light source, and identifying contamination on the optical window based at least in part on the at least one detected light intensity obtained from the at least one light sensor.

According to some embodiments, the at least one light source is coupled to a movable stage, and the method further comprises operating a motor to scan the movable stage along a first direction whilst operating at least one optical component arranged to direct the light from the light source back and forth through any of a plurality of locations along a second direction perpendicular to the first direction, thereby scanning the light over a two-dimensional region.

According to some embodiments, identifying contamination on the optical window based at least in part on the values of detected light intensity from the at least one light sensor further comprises identifying contamination on the optical window based at least in part on a known calibration pattern, filtering out false indications of contamination based at least in part on the known calibration pattern, and categorizing contamination as scattering or absorptive based at least in part on the known calibration pattern.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 10A-10B illustrate a schematic view of a stereolithographic printer that forms a plurality of layers of a part, according to some embodiments.

DETAILED DESCRIPTION

Figure 1:
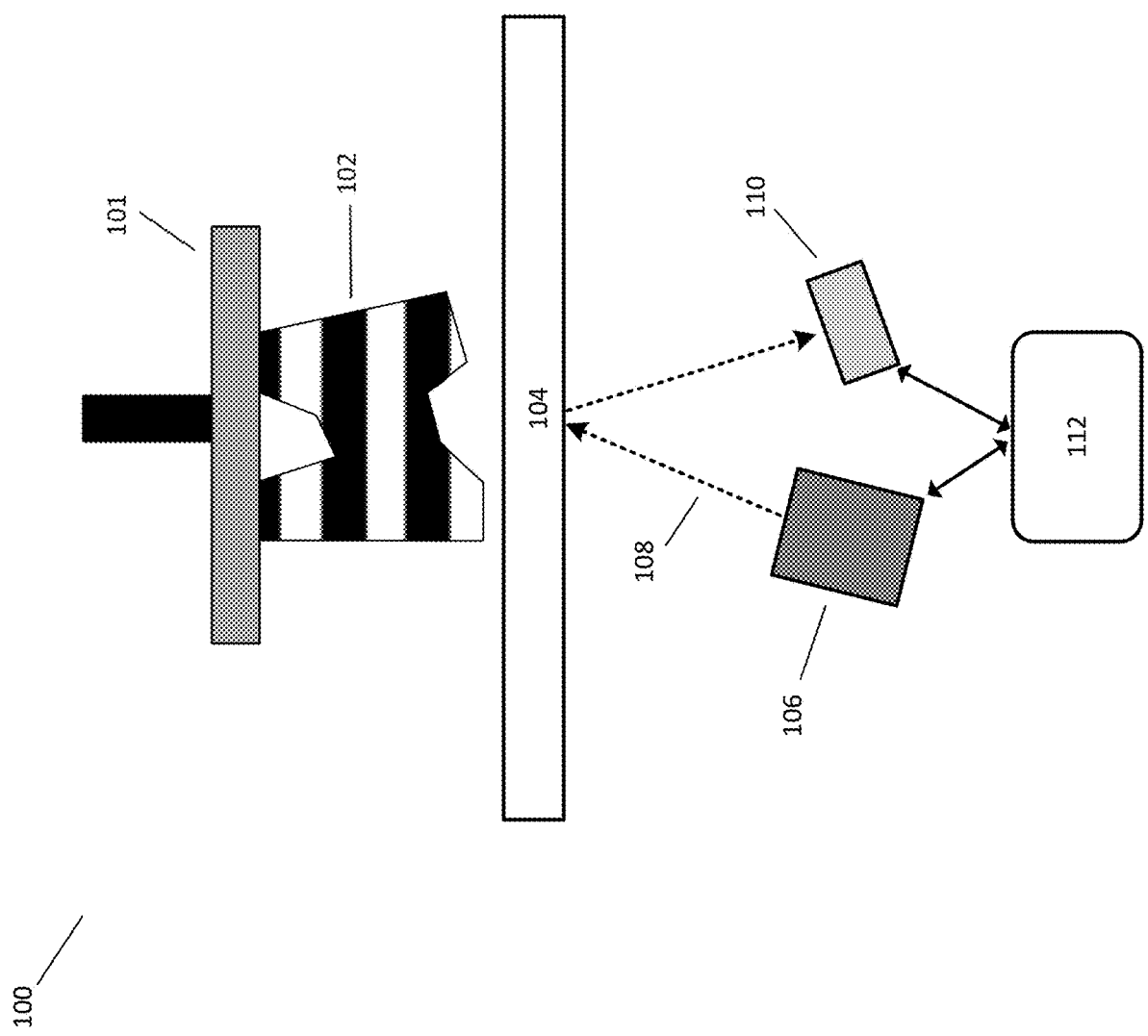
FIG. 1 provides a schematic view of an additive fabrication device, according to some embodiments.

Systems and methods for identifying contamination and detecting failure modes in an additive fabrication device are provided. As discussed above, some additive fabrication techniques form solid objects by solidifying (also referred to herein as "curing") a photocurable liquid, such as a photopolymer resin, by exposure to actinic radiation, such as light. The quality (e.g., accuracy, level of detail, etc.) of the resulting fabricated object depends at least in part on the control and consistency of said light. For instance, when directing light from a light source onto the photocurable liquid, various optical components may be arranged within the path of the light as it travels from the source to the liquid. If one or more of these components are contaminated with foreign matter such as dust, the light may be scattered and/or absorbed leading to less light than desired reaching the liquid. As a result, some regions of liquid may be cured less than desired. In some cases, other regions of liquid may be cured unintentionally as a result of light scattering.

Conventional additive fabrication devices may address contamination in various ways, such as attempting to seal optical components such as mirrors and/or lenses within a housing such that foreign matter will be unable to reach the components. It may be inevitable, however, for at least one optical component to be exposed to the environment in order for the additive fabrication device to operate because, even if a light source is disposed within a housing, it may be necessary for light to travel from the source to outside of the housing to reach the photocurable liquid. For instance, an optical window is often arranged within a housing to allow light to propagate from within the housing to outside of the housing. Such a window may be contaminated by foreign matter such as dust or stray photocurable liquid however, as discussed above. When such contamination occurs in a conventional additive fabrication device, there may be no way for a user to become aware that such contamination has occurred until it has a direct effect on the quality of fabricated parts (e.g., until the print quality has deteriorated significantly). Such an approach may result in poor print quality and the waste of photocurable liquid, which negatively impacts the user experience. One solution may be to suggest routine cleaning to mitigate any fabrication issues caused by contamination. However, routine cleaning requires unnecessary time input. Additionally, excessive and unnecessary interactions with the optical window may increase the possibility of damaging (e.g., scratching) the optical window or interfering with the alignment of sensitive optical components.

The inventors have recognized and appreciated techniques for identifying contamination in additive fabrication devices by measuring light interacting with (e.g., scattering from, being absorbed by, reflecting from, etc.) contamination using one or more light sensors. As discussed above, contamination located between a light source and the liquid photopolymer resin that is to be cured can affect the quality of the fabricated object when the light is scattered or blocked by the contamination. Identifying the presence of contamination between the light source and the liquid photopolymer resin and alerting the user prior to initiating a fabrication process may increase the quality of the resulting fabricated object and improve the user experience by saving time and photocurable liquid.

According to some embodiments, an additive fabrication device may include at least one light sensor arranged to receive light subsequent to its interaction with contamination within the optical system. The additive fabrication device may include a light source arranged to direct light through an optical window such that the light may be scattered, reflected and/or absorbed by contamination and received by the light sensor. In the case of a stereolithographic additive fabrication device, this light source may be the same as, or different from, the light source used to cure the liquid photopolymer. Irrespective of how the at least one light sensor is configured with respect to fabrication, the sensor(s) may detect and measure values of light intensity from light scattered, reflected and/or absorbed from said contamination. In this manner, the presence of contamination within the additive fabrication device may be identified.

According to some embodiments, an additive fabrication device may include a calibration plate exhibiting a known calibration pattern (e.g., on its surface). The calibration plate may be formed of any one of a number of materials, including, but not limited to, metal, plastic, glass, paper or combinations thereof. According to some embodiments, the known calibration pattern may include at least one area or pattern which scatters light and at least one area or pattern which absorbs light. For example, the pattern may include a grid or checkerboard in black and white, or various shades of grey. The known calibration pattern may be fabricated by any one of a number of methods, including, but not limited to, anodization, metal plating, laser marking, ink printing, painting, drawing, etching, sandblasting, or combinations thereof. According to some embodiments, the optical system may be configured to operate a light source to scan a known calibration pattern. Such a scan may encompass at least one area or pattern which scatters light and the at least one area or pattern which absorbs light. Light incident upon regions that absorb or scatter light is expected to have different trajectories. As a result, contamination that absorbs light is expected to act upon light differently from calibration pattern regions that scatter light, and—conversely—contamination that scatters light is expected to act upon light differently from regions that absorb light. By directing light onto the calibration pattern and receiving light scattered from the pattern, therefore, contamination may both be detected and identified as being a type of contamination that either absorbs or scatters light.

According to some embodiments, an additive fabrication device may include at least one light sensor arranged to receive light subsequent to its interaction with a part being fabricated and/or from debris present within a build region of an additive fabrication process. Such a light sensor may detect light intensity of light scattered or reflected onto the sensor from a part or from debris during an additive fabrication process. Since cured and uncured photocurable liquids may exhibit different optical properties (e.g., reflective or absorptive properties), the intensity of light received by a sensor may indicate whether a location within the build region (e.g., within liquid, within a cured region of a part, within a region in which debris is located) comprises cured or uncured photopolymer (or indeed whether the region comprises photopolymer in any of various intermediate stages of the curing process). Analysis of such light may identify, for instance, whether a fabrication process has failed, whether debris is located within a photopolymer liquid (and may risk producing a fabrication failure), etc. Potential problems encountered during an additive fabrication process such as, but not limited to, the above may be collectively referred to herein as "failure modes."

Although particular methods of identifying contamination and detecting failure modes using the reflection of light in an additive fabrication device have been described and shown herein, it is envisioned that the functionality of the various methods, systems, apparatus, objects, and computer readable media disclosed herein may be applied to any now known or hereafter devised additive fabrication technique wherein it is desired to identify contamination or detect failure modes of an additive fabrication process.

Figure 10B:
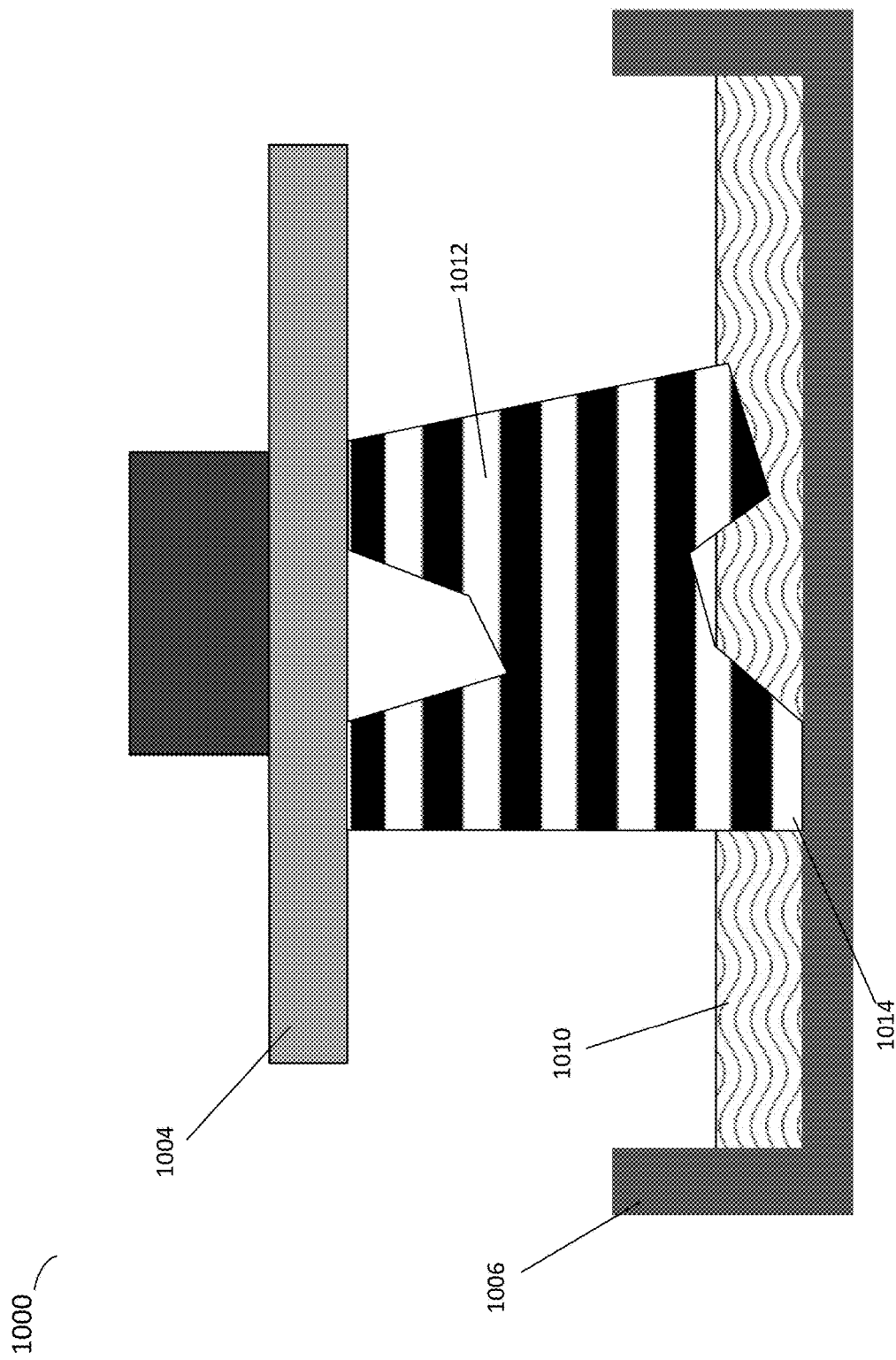

To illustrate one exemplary additive fabrication technique, an inverse stereolithographic printer is depicted in FIGS. 10A-B. Exemplary stereolithographic printer 1000 forms a part in a downward facing direction on a build platform such that layers of the part are formed in contact with a surface of a container in addition to a previously cured layer or the build platform. In the example of FIGS. 10A-B, stereolithographic printer 1000 comprises build platform 1004, container 1006, and liquid photopolymer 1010. A downward facing build surface 1004 opposes the floor of container 1006, which is filled with a liquid photopolymer 1010. FIG. 10A represents a configuration of stereolithographic printer 1000 prior to formation of any layers of a part on build surface 1004.

As shown in FIG. 10B, a part 1012 may be formed layerwise, with the initial layer attached to the build platform 1004. The container's floor may be transparent to actinic radiation such as light, which can be targeted at portions of the thin layer of liquid photocurable resin resting on the floor of the container. Exposure to actinic radiation such as light cures a thin layer of the liquid resin, which causes it to harden. The layer 1014 is at least partially in contact with both a previously formed layer and the surface of the container 1006 when it is formed. The top side of the cured resin layer typically bonds to either the bottom surface of the build surface 1004 or with the previously cured resin layer in addition to the transparent floor of the container. In order to form additional layers of the part subsequent to the formation of layer 1014, any bonding that occurs between the transparent floor of the container and the layer must be broken. For example, one or more portions of the surface (or the entire surface) of layer 1014 may adhere to the container such that the adhesion must be removed prior to formation of a subsequent layer.

Portions of an illustrative additive fabrication device is depicted in FIG. 1, according to some embodiments. Additive fabrication device 100 includes a build platform 101 that is configured to adjust its position towards and away from optical window 104 and form layers of a part on the build surface (e.g., in the manner discussed above in the context of FIGS. 10A-B). The build platform 101 may support a part 102 being formed by the additive fabrication process. Part 102 may be formed by the curing of a photocurable liquid such as a photopolymer as described previously.

In the example of FIG. 1, the optical window 104 may be arranged between the light source 106 and a container of liquid photopolymer (not shown), or in some cases may form part of such a container. In the example of FIG. 1, the optical window 104 may be formed of glass, plastic, and/or any other transparent material(s). Light source 106 may be arranged and configured to direct light 108 towards optical window 104 such that at least some of the light 108 is reflected back and received by light sensor 110 as a result. Light 108 may be reflected onto the light sensor 110 by, for example, a liquid photopolymer arranged on the opposing side of the optical window from the light source, contamination disposed on either the upper or lower surface of the optical window 104, debris within a container of the additive fabrication device 100, and/or by the part 102. If the light sensor 110 is able to determine, based on the light received, whether the light 108 was scattered and/or absorbed, and by what type of object, contamination within the additive fabrication device and/or a state of the additive fabrication process, the additive fabrication process can be adjusted or certain actions may be suggested before future additive fabrication processes are begun.

According to some embodiments, light source 106 may include a scanning or pixelated light source, a laser (which may be, for instance, steered with one or more galvanometers and/or a rotating polygonal mirror), a digital light processing (DLP) device, a liquid-crystal display (LCD), a liquid crystal on silicon (LCoS) display, a light emitting diode (LED) array, a scanned LED array, or combinations thereof. Moreover, additional optical components may be arranged in the path of light emitted by the light source 106 so as to direct light toward a desired position on the optical window, such as, but not limited to, one or more lenses, mirrors, filters, galvanometers, or combinations thereof.

According to some embodiments, light sensor 110 may include a photodiode, a light dependent resistor (LDR), a phototransistor, a photomultiplier tube (PMT), an active-pixel sensor (APS), or combinations therefore. In some cases, the light sensor 110 may comprise multiple individual sensor elements; for example, the light sensor 110 may comprise an array of photodiodes.

According to some embodiments, the light sensor 110 may be coupled to one or more processors 112 or other controllers configured to perform analysis of signals produced by the light sensor. For instance, one or more processors 112 may be configured to analyze a signal indicating a light intensity received over time and correlate the signal with the intensity and direction of light produced by the light source 106. In some cases, one or more processors 112 may be coupled to both light source 106 and light sensor 110 and configured to operate the light source and analyze signals produced by the light sensor. Examples of such analyses are discussed below. Optionally, the one or more processors 112 may also operate other components which affect the direction of light produced by the light source, such as a movable stage, one or more galvanometers, etc.

While any suitable technique may be applied to direct light from a light source 106 onto various locations on an optical window 104, for purposes of illustration an additive fabrication device in which the light source 106 is arranged on a movable stage will be described in relation to FIGS. 2 and 3. A light source arranged on a movable stage may for instance move along one axis beneath an optical window whilst directing light to different positions along a different axis (e.g., with a galvanometer). Thus, by moving the stage and directing light along the axis, light may be directed to any desired location on the optical window. Alternatively, as shown and discussed below, a movable stage may comprise the optical window such that the optical window moves with the movable stage whilst directing light through various positions along an axis. In each of these two approaches utilizing a movable stage, there may be relative motion between the light source and the space on the other side of the optical window.

Figure 2:
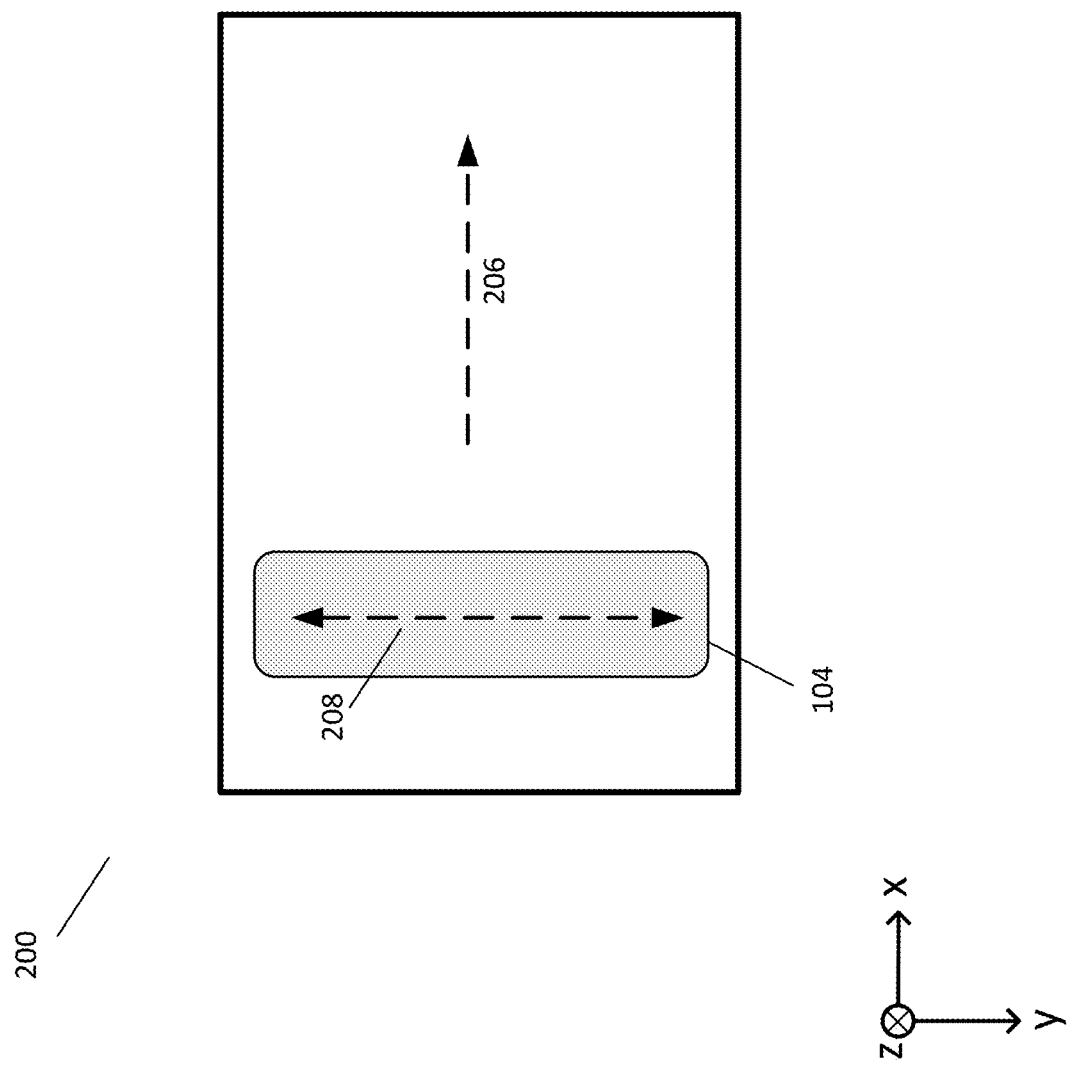
FIG. 2 provides a schematic view of a fabrication area, according to some embodiments.

FIG. 2 depicts an illustrative two-dimensional area 200 that may be scanned by the light source 106, according to some embodiments. In the example of FIG. 2, various positions within the area 200 may be accessed by the light source 106 by directing the light (also referred to as "scanning" the light) in two different directions, namely along an x-axis 206 and along a y-axis 208. According to some embodiments, light may be scanned along the x-axis 206 by motion of the optical window 104 (which may move with a movable stage as discussed above) and corresponding optical components such as the light source 106 and light sensor 110. Scanning light along the x-axis 206 may be accomplished by moving a movable stage using one or more motors (not pictured) such as a servo motor, a stepper motor, a direct drive motor, and/or an AC brushless motor. Light may be scanned along the y-axis 208 by directing the light 108 from the light source 106 by additional optical components such as a mirror and/or a galvanometer.

During an additive fabrication process in which the light source 106 is also used to cure a liquid photopolymer, the light source 106 may direct light 108 through optical window 104 onto a photocurable liquid such as a photopolymer resin. As discussed previously, exposure to actinic radiation such as light will cure a thin layer of the photocurable liquid and enable the formation of successive thin layers one on top of another to create the part 102. In order to form a three-dimensional part 102, the light 108 may be directed to various positions within the two-dimensional print area 200.

Figure 3:
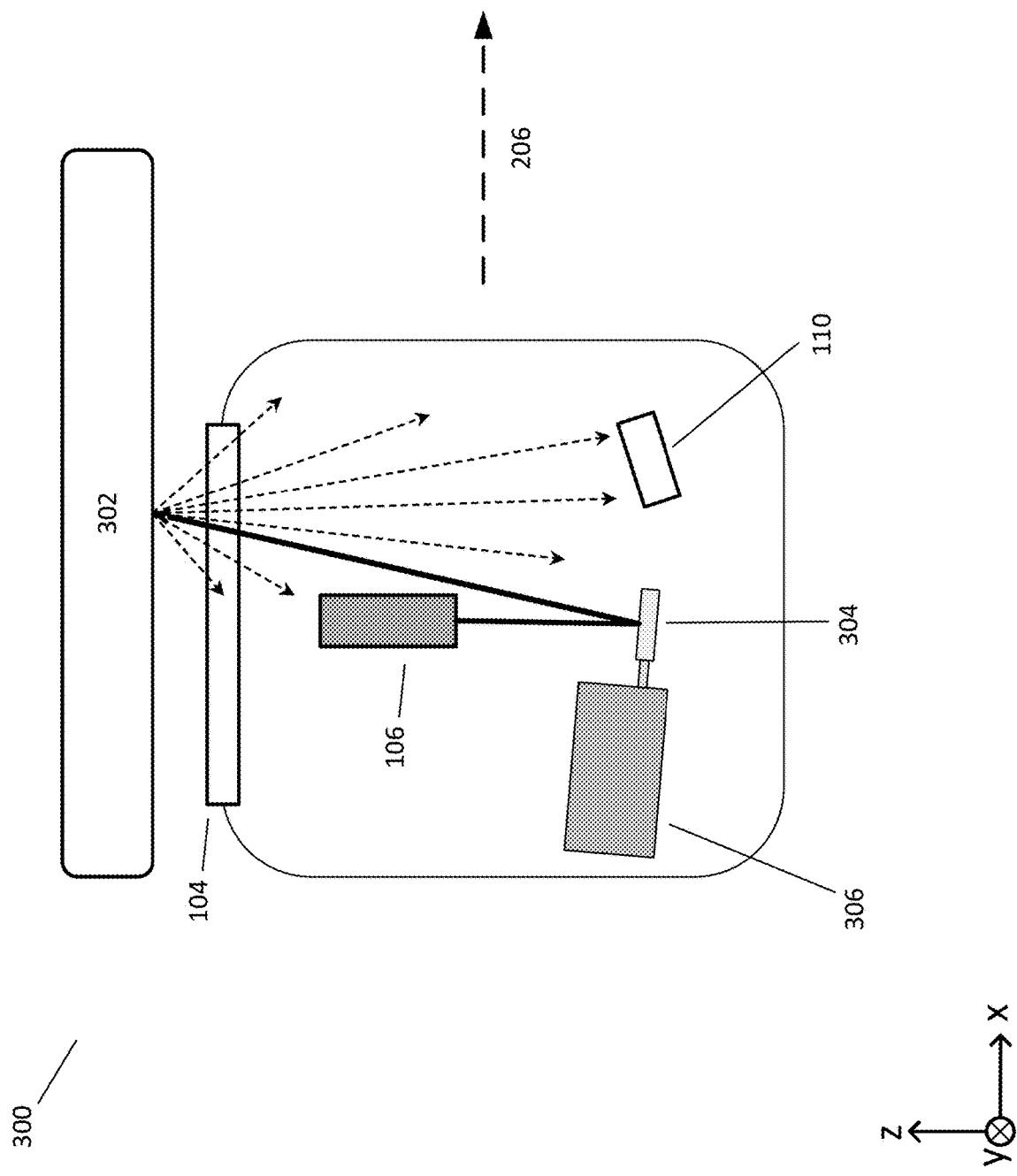
FIG. 3 provides a schematic view of an additive fabrication device with several optical components, according to some embodiments.

FIG. 3 depicts an illustrative approach to detecting contamination on the surface of optical window 104 in an additive fabrication device 300, according to some embodiments. In the example of FIG. 3, light source 106 is arranged to direct light onto optical component 304, which may be, as a non-limiting example, a mirror. The light is then directed towards the optical window 104 by the optical component 304, and may pass through the optical window onto the calibration plate 302. Light incident upon the calibration plate 302 may be reflected back through the optical window 104, and light sensor 110 may receive at least some of the reflected light.

In the example of FIG. 3, optical component 304 may direct light from the light source 106 to various positions along the y-axis by mechanical component 306, which may be a galvanometer according to some embodiments. The optical components such as optical window 104, light source 106, and light sensor 110 may be, as a group, moved in a direction along the x-axis 206 by a motor or other suitable actuator (not pictured). Additional lenses and/or mirrors to further control the light beam size, focus, and direction may be included in some embodiments. In this manner, light produced by the light source 106 may be scanned through a two-dimensional area, as described in the discussion of FIG. 2.

It may be appreciated that scanning light along the x-axis 206 and y-axis 208 may be accomplished in multiple ways. In particular, some embodiments may keep the optical window 104 and corresponding optical components stationary while moving the calibration plate 302 along the x-axis 206. Some embodiments may move the optical window 104 and corresponding optical components along both the x-axis 206 and the y-axis 208 while keeping the calibration plate 302 stationary. Some embodiments may move the calibration plate 302 along both the x-axis 206 and the y-axis 208. Some embodiments may keep all components stationary, instead scanning the calibration plate 302 by directing the light 108 along both the x-axis 206 and the y-axis 208 so that the light 108 scans the entire two-dimensional area of the calibration plate 302.

According to some embodiments, calibration plate 302 comprises a surface with a known pattern with regions that either scatter or absorb the light 108. The known pattern may be used as a reference calibration map in x-y space, as defined by x-axis 206 and y-axis 208. The calibration plate 302 may be formed of any one of a list of materials including, but not limited to, metal, plastic, glass, or paper. The known pattern may be formed by processes such as, but not limited to, anodization, laser marking, ink printing, painting, sandblasting, or etching. The known pattern ideally provides maximized contrast between the scattering or absorbing regions formed on the surface of the calibration plate.

Figure 11:
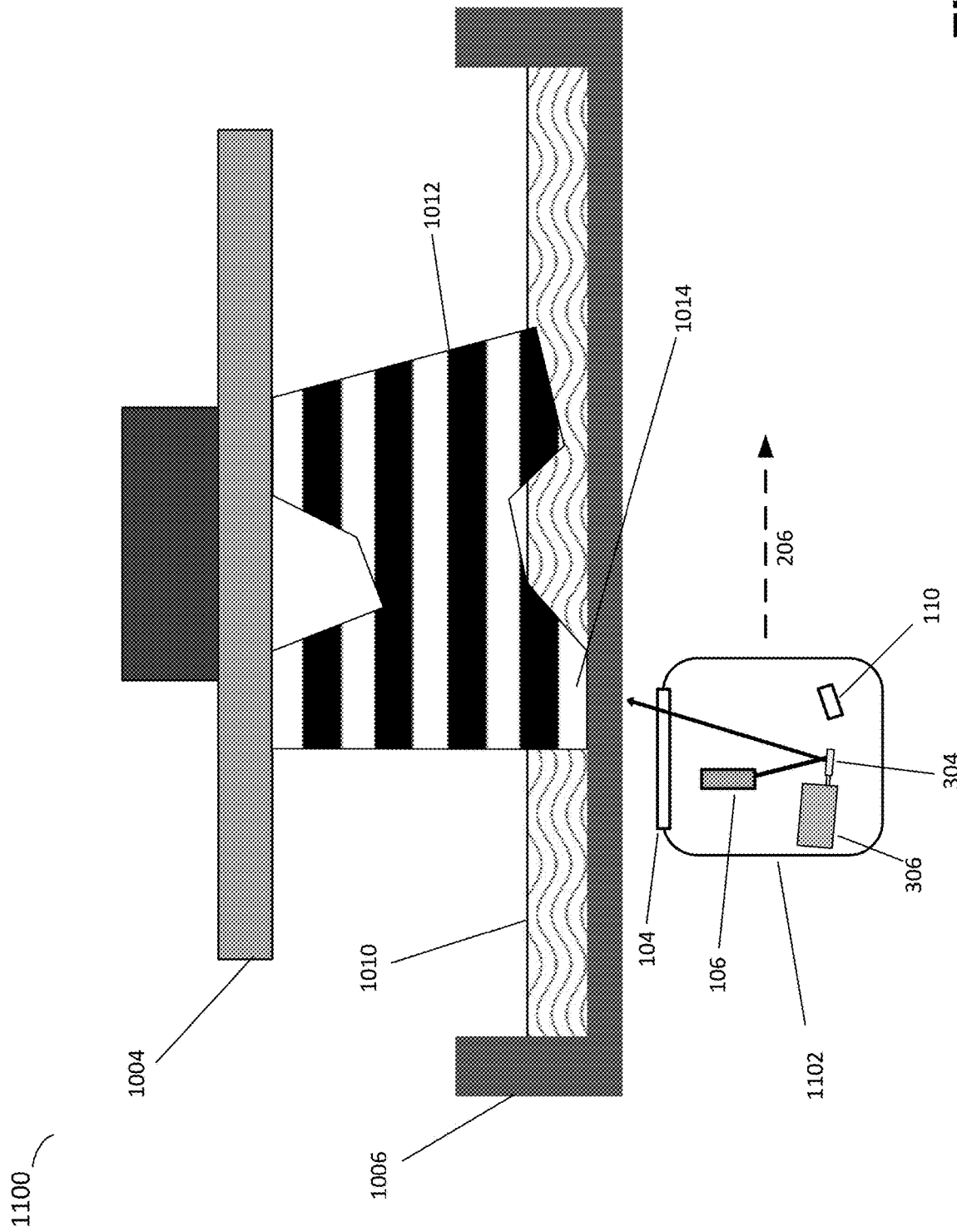
FIG. 11 illustrates a schematic view of a stereolithographic printer that includes a moveable stage.

An exemplary additive fabrication device 1100 is depicted in FIG. 11. In this illustrative example, optical components such as light source 106, light sensor 110, optical component 304, and mechanical component 306 may be housed in a movable stage 1102 (which may also be termed an "optical module"). Optical window 104 is disposed on or within movable stage 1102 such that light may be directed out of movable stage 1102 and onto container 1006 and photopolymer 1010 to form layers of a part 1012 during an additive fabrication process, such as the exemplary additive fabrication process of FIGS. 10A and 10B. Light may also return through optical window 104 by reflecting off of, for example, contamination on optical window 104, debris in photopolymer 1010, and/or layer 1014.

Movable stage 1102 may be formed of any suitable material to protect the housed components from debris and/or mechanical damage. For example, movable stage 1102 may be formed of rigid or flexible material. Movable stage 1102 may be formed in such a way as to be sealed from the outside environment in order to keep out any debris (e.g. dust, photopolymer resin, and/or other particulates, as non-limiting examples). Movable stage 1102 may be scanned along the x-axis 206 while light is scanned along the y-axis 208 (not pictured) by optical component 304 and/or mechanical component 306, thereby scanning light through a 2-dimensional area.

Various types of contamination may potentially be present on an optical window, such as optical window 104. Generally, contamination may be expected to absorb incident light to some degree and/or to reflect or otherwise scatter light to some degree. In the discussion that follows, contamination that predominantly absorbs light (i.e., absorbs light more than scatters light) is referred to as "light absorbing" contamination. Similarly, contamination that predominantly scatters light (i.e., scatters light more than absorbs light) is referred to as "light scattering" contamination. Light absorbing contamination may, for instance, comprise any object that will not scatter the light back towards the detector such as comparatively large pieces of debris, hair, large pieces of dust, large particles, or combinations thereof. Light scattering contamination may, for instance, comprise any contamination that will scatter light back towards the detector such as photocurable materials, scratches, and smaller, more reflective dust particles, or combinations thereof. Notwithstanding the above nomenclature, it will be appreciated that light may be absorbed, or be scattered by, contamination to varying degrees and that the above terminology is provided for clarify of explanation and is not limiting with respect to the spectrum of light absorption and/or scattering that may be produced by contamination. It may also be appreciated that a single source of contamination may absorb or scatter light under different conditions, including, but not limited to, illumination with different wavelengths of light and/or being located at different distances from the light source 106.

Figure 4A:
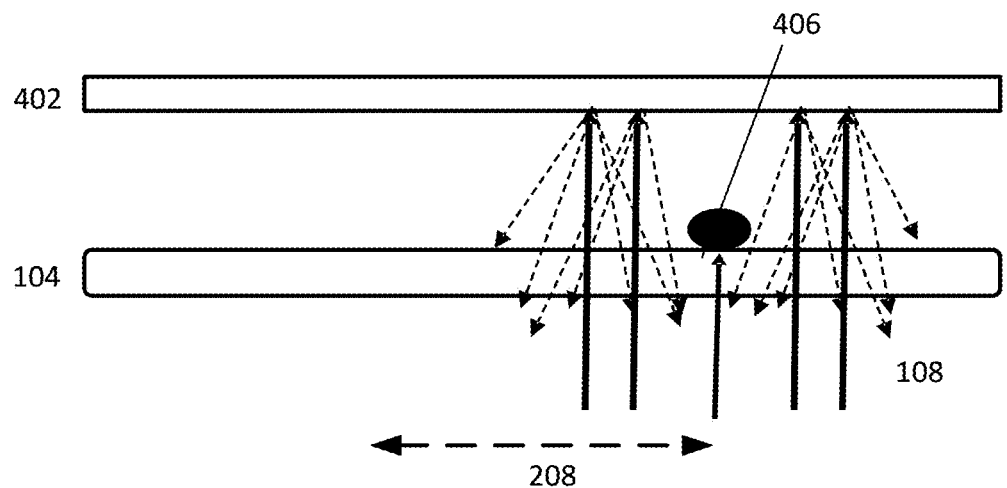
FIGS. 4A-B depict the behavior of light incident on absorptive and scattering contamination, respectively, according to some embodiments.

In the example of FIG. 4A, when light absorbing contamination 406 is scanned in front of a light scattering background 402, such as a background or pattern which may be present on a calibration plate, the light absorbing contamination 406 may be detected by the light sensor 110 as a region which does not scatter light. The light scattering background 402 may provide contrast that allows for the detection of light absorbing contamination 406.

Figure 4B:
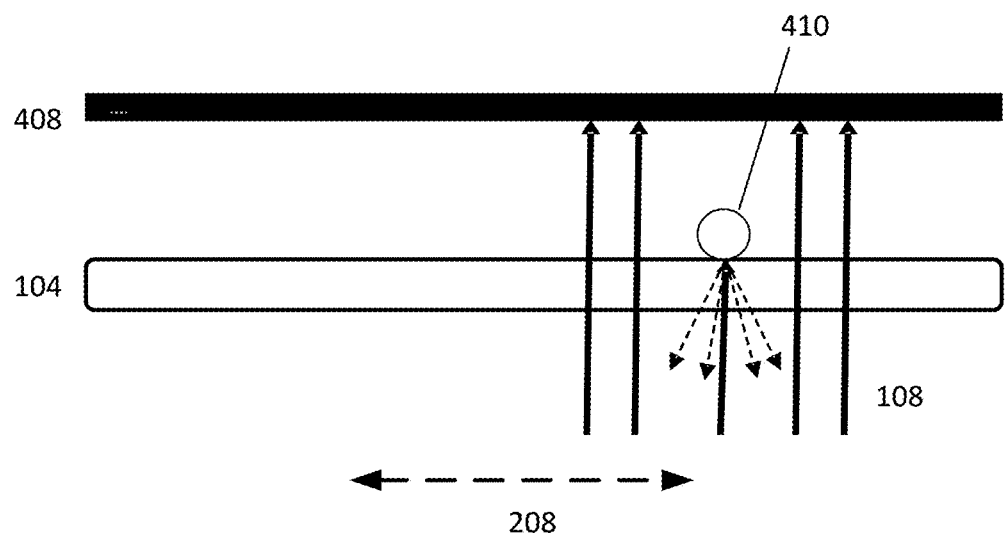

In the example of FIG. 4B, when light scattering contamination 410 is scanned in front of light absorbing background 408, such as a background or pattern which may be present on calibration plate 302, the light scattering contamination 410 will be detected by the light sensor 110 as a region which scatters light. The light absorbing background 408 may provide contrast that allows for the detection of light scattering contamination 410.

The inventors have recognized and appreciated that in order to detect both light absorbing contamination 406 and light scattering contamination 410 that may be present on the optical window, calibration plate 302 may have at least one region comprising a scattering background 402 and at least one region comprising an absorbing background 408. When light absorbing contamination 406 is scanned beneath light absorbing background 408, there may be no contrast between the light absorbing contamination 406 and the light absorbing background 408. Similarly, when light scattering contamination 410 is scanned beneath light scattering background 402, there is no contrast between the light scattering contamination 410 and the light scattering background 402. In some embodiments, the light scattering background 402 and the light absorbing background 408 may comprise solid areas which scatter or absorb light, or they may comprise patterned areas.

The inventors have recognized and appreciated that the reflectance of contamination may allow for the determination of the location of the contamination (e.g., on which side of the optical window 104 the contamination is located). In particular, the inventors have recognized that in some embodiments where the light source 106, light sensor 110, and other optical components are housed in a module such as movable stage 1102 comprising an optical window 104, that contamination on the inside surface of the optical window 104 will be closer to the light sensor 110 than if the contamination were located on the outside surface of the optical window 104. Contamination that is closer to the light sensor 110 may provide a stronger light signal to light sensor 110 and may be more prone to scattering light than contamination that is further away from light sensor 110. Such behavior may be observed, in at least some cases, even if the contamination may be otherwise categorized as a light absorbing type of contamination.

Figure 4C:
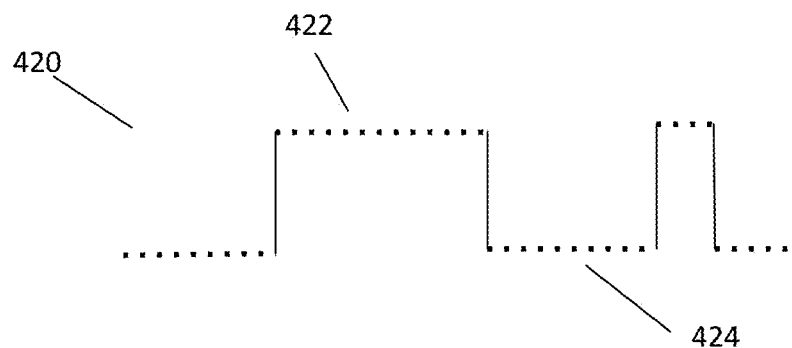
FIG. 4C depicts an illustrative signal produced by a light sensor, according to some embodiments.

FIG. 4C is an illustrative depiction of an electrical signal 420 output from the light sensor 110 in response to the light which is directed back through the optical window during a scan process. Peak 422 represents an electrical signal of a first value due to scattered light while trough 424 represents an electrical signal of a second value lower than the first value due to a lack of scattered light. That is, trough 424 depicts a detection of a light absorbing background 408 or light absorbing contamination 406.

Figure 5:
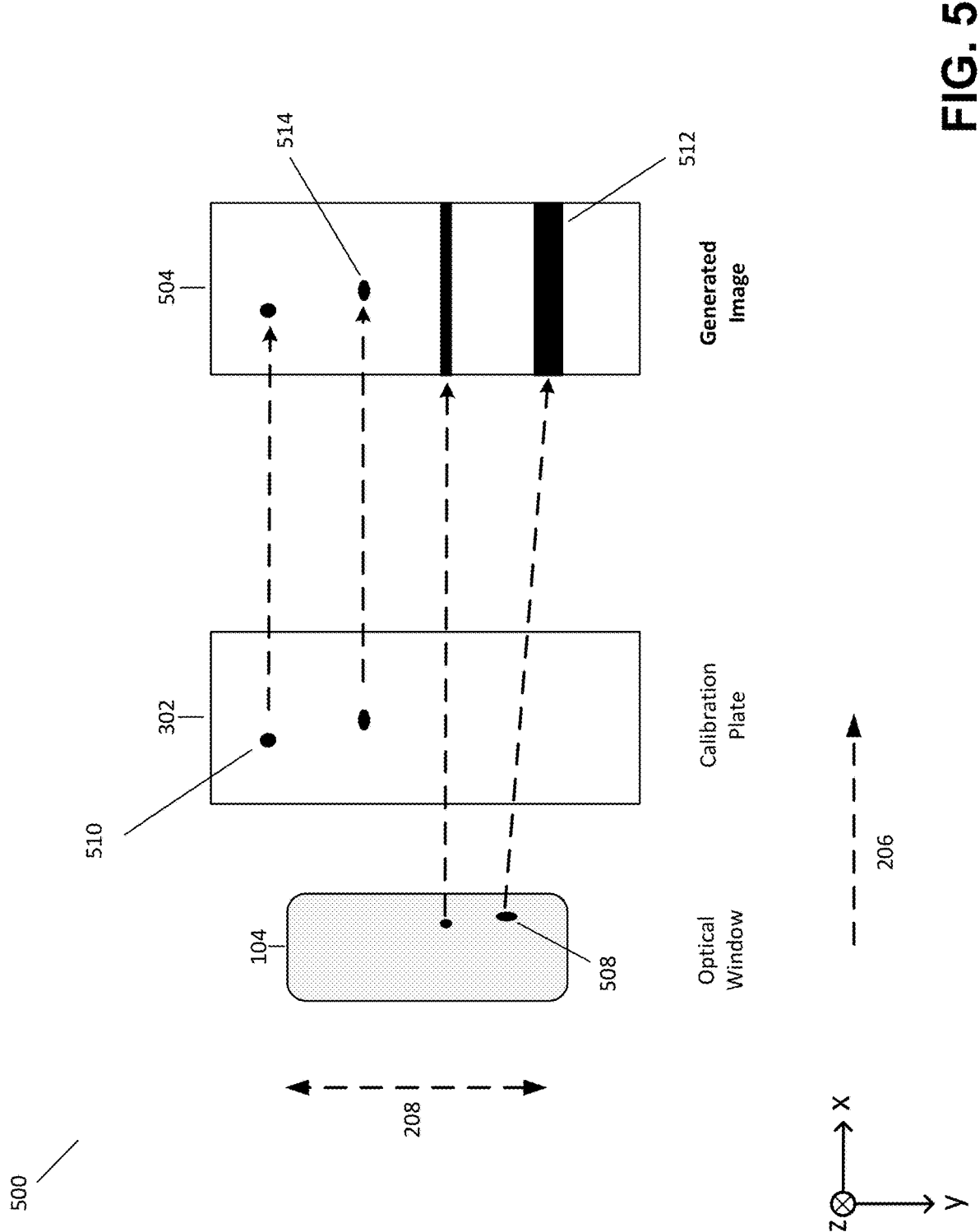
FIG. 5 depicts an illustrative image generated based on signals received by light sensor, according to some embodiments.

FIG. 5 depicts an exemplary resulting image 504 from a scan taken wherein contamination is present on both the optical window 104 and calibration plate 302, according to some embodiments. Resulting image 504 may be a two-dimensional array of pixels, each with a color value corresponding to the value of electrical signal 420 from the light sensor 110 at each point within the two-dimensional scan of the calibration plate 302 as taken along the x-axis 206 and y-axis 208. Scanning along both the x-axis 206 and the y-axis 208 allows for a differentiation between contamination 508 disposed on the optical window 104 and contamination 510 disposed on the calibration plate 302.

In the example of FIG. 5, contamination 508 is disposed on the optical window 104. According to some embodiments, as the optical window is moved along the x-axis 206, the contamination 508 remains stationary on the optical window. That is, each time the light 108 is directed along the y-axis 208, it encounters contamination 508 at a particular position along the y-axis 208 because contamination 508 is stationary on optical window 104. For each step along the x-axis, contamination 508 blocks or scatters light at the same location, resulting in line 512 in resulting image 504.

Conversely, in the example of FIG. 5, contamination 510 is disposed on the calibration plate 302. According to some embodiments, as the optical window is moved along the x-axis 206, the contamination 510 remains stationary on the calibration plate 302. That is, until the optical window is disposed at the same position along the x-axis as the contamination 510, the light 108 will not encounter contamination 510 as it is scanned along the y-axis 208. When the optical window is disposed at the same position along the x-axis as the contamination 510, the light 108 will encounter contamination 510 and contamination 510 will be detected by light sensor 110 as contamination 510 scatters or absorbs light. Contamination 510 appears in resulting image 504 as a dot and can be differentiated from contamination 508 disposed on the optical window 104.

In some embodiments, the calibration plate 302 may be moved along the x-axis 206 relative to a stationary optical window. Differentiation between contamination 508 disposed on the optical window 104 and contamination 510 disposed on the calibration plate 302 proceeds in the same manner as in embodiments where the optical window 104 is moved along the x-axis 206, as described previously.

Figure 6:
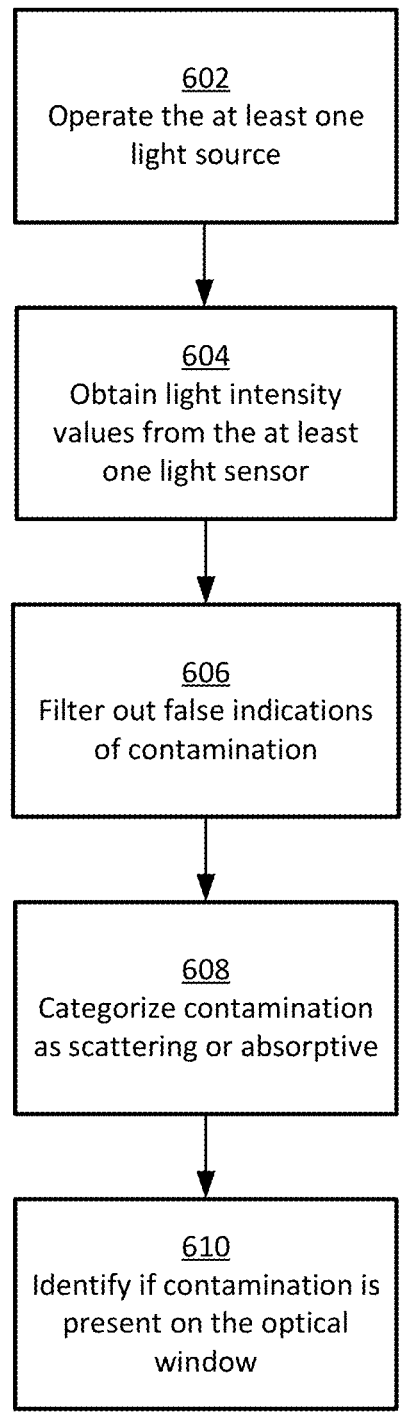
FIG. 6 provides a schematic of a computing system on which aspects of the invention may be implemented.

FIG. 6 is a flowchart of a method of identifying contamination on an optical window in an additive fabrication device, according to some embodiments. Method 600 may be performed by any suitable combination of computing system(s) and/or additive fabrication device(s), an example of which is provided in FIG. 9 described below.

In act 602, at least one light source such as light source 106 is operated. Operating said light source may comprise receiving data representing the position, direction, or motion of the light source and whether the light source is powered on or off via a communication device and/or reading such data from one or more recordable storage media. Operating said light source may further comprise sending instructions to the light source to change position, direction, motion, and/or powered status via a communication device.

Operating the light source may further comprise operating additional optical components such as a mirror galvanometer or a rotating polygon to direct the light from said light source. Operating additional optical components may comprise receiving data representing the position, direction, or motion of the optical components via a communication device and/or reading such data from one or more recordable storage media. Operating said additional optical components may further comprise sending instructions to the additional optical components to change position, direction, and/or motion of the additional optical components via a communication device.

Operating the light source may also further comprise operating a motor as described in the above discussion of FIG. 2 in order to enable scanning of the two-dimensional print area 200. Operating a motor may comprise receiving data representing the position, direction of motion, or speed of said motor via a communication device and/or reading data from one or more recordable storage media. Operating said motor may further comprise sending instructions to the motor to change position, direction of motion, or speed via a communication device.

In act 604, light intensity values from at least one light sensor such as light sensor 110 are received. Receiving said light intensity values may comprise receiving data via a communication device and/or reading such data from one or more recordable storage media. It will be appreciated that the light intensity values obtained in act 604 may be represented by any number of data files or data structures so long as data descriptive of said light intensity values is received.

In act 606, false indications of contamination are filtered out. Filtering said false indications may comprise a processor connected to the additive fabrication device assembling the data that represents the light intensity values into a two-dimensional image corresponding to the scan of the x-axis 206 and the y-axis 208. Filtering false indications of contamination may further comprise the processor identifying expected features of the known calibration pattern in the two-dimensional image and subtracting light intensity values corresponding to these expected features. Light intensity values corresponding to the expected features of the known calibration pattern may be determined from the received light intensity values. Light intensity values corresponding to the expected features of the known calibration pattern may be read from stored values on one or more recordable storage media.

Filtering indications of contamination may further comprise identifying contamination disposed on the calibration plate 302 rather than the optical window 104 as discussed in the description of FIG. 5. Identifying contamination disposed on the calibration plate 302 may comprise the processor using shape detection methods known to those with skill in the art to identify whether contamination features extend linearly across the x-axis 206 in the two-dimensional image corresponding to the scan of the x-axis 206 and the y-axis 208. Upon identification of a non-linear feature, filtering indications of contamination disposed on the calibration plate 302 may further comprise subtracting the light intensity values corresponding to the non-linear feature from the received light intensity values.

In act 608, contamination is categorized as scattering or absorptive. Contamination that can be observed against a light scattering background is categorized as light absorbing contamination, while contamination that can be observed against a light absorbing background is categorized as light scattering contamination. While either type of contamination can be detrimental to print quality, it may be beneficial to understand what type of contamination is on the optical window for purposes of preventing future contamination.

In act 610, contamination is identified as being present on the optical window 104. Identifying said contamination as being present on the optical window 104 may comprise the processor using shape detection methods known to those with skill in the art to identify whether there are any remaining contamination features that extend linearly across the x-axis 206 in the two-dimensional image corresponding to the scan of the x-axis 206 and the y-axis 208. Identifying the presence of contamination on the optical window 104 may further comprise displaying to a user the filtered two-dimensional image corresponding to the scan of the x-axis 206 and y-axis 208 on a monitor or other display such as will be described in the discussion of FIG. 9 below.

Figure 7:
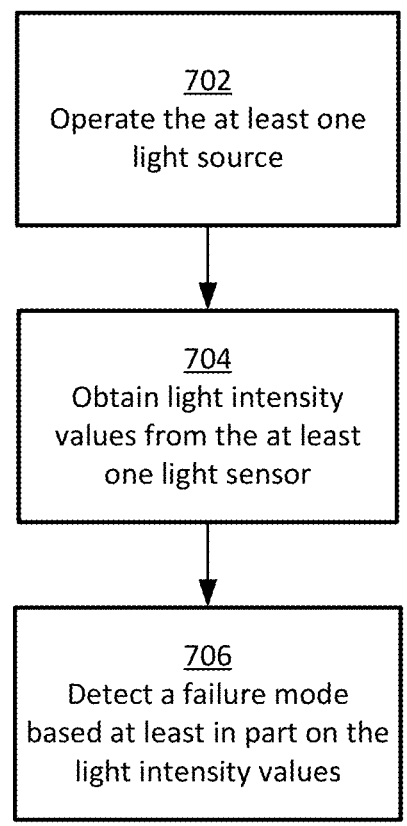
FIG. 7 illustrates a flow chart of a process suitable for detecting contamination on the surface of an optical window, according to some embodiments.

FIG. 7 is a flowchart of a method of detecting a failure mode of an additive print process, according to some embodiments. Method 700 may be performed by any suitable combination of computing system(s) and/or additive fabrication device(s), an example of which is provided in FIG. 8 described below.

In act 702, at least one light source such as light source 106 is operated. Operating said light source may comprise receiving data representing the position, direction, or motion of the light source, reading such data from one or more recordable storage media, powering the light source on or off, and/or sending instructions to the light source to change position, direction, motion, and/or powered status via a communication device during an additive fabrication process.

Operating the light source may further comprise directing light from the light source through optical components such as a mirror galvanometer, a parabolic mirror, and/or a rotating polygonal mirror to direct the light from said light source. Operating optical components may comprise receiving data representing the position, direction, or motion of the optical components via a communication device and/or reading such data from one or more recordable storage media. Operating said additional optical components may further comprise sending instructions to the additional optical components to change position, direction, and/or motion of the additional optical components via a communication device.

Operating the light source may also further comprise operating a motor as described in the above discussion of FIG. 2 in order to enable scanning of the two-dimensional print area 200. Operating a motor may comprise receiving data representing the position, direction of motion, or speed of said motor via a communication device and/or reading data from one or more recordable storage media. Operating said motor may further comprise sending instructions to the motor to change position, direction of motion, or speed via a communication device.

In act 704, light intensity values from at least one light sensor, such as light sensor 110, are received. Receiving said light intensity values may comprise receiving data via a communication device and/or reading such data from one or more recordable storage media. It will be appreciated that the light intensity values obtained in act 704 may be represented by any number of data files or data structures so long as data descriptive of said light intensity values is received.

In act 706, a failure mode of the additive fabrication process is detected based at least in part on the light intensity values received in act 704. Cured and uncured photocurable liquid may have different absorptive or reflective properties. Detecting a failure mode of the additive fabrication process may comprise the processor comparing the received light intensity values to an expected value or values of light intensity corresponding to the properties of cured and uncured photocurable liquid.

Detecting a failure mode of the additive may further comprise identifying if a portion of the build part has detached from the build part during the additive fabrication process. Identifying if a portion of the build part has detached from the build part may comprise comparing the received light intensity values to an expected light intensity map generated by the processor from a three-dimensional map of the build part. The expected light intensity map may correspond to discrete layers within the three-dimensional map of the build part.

Figure 8:
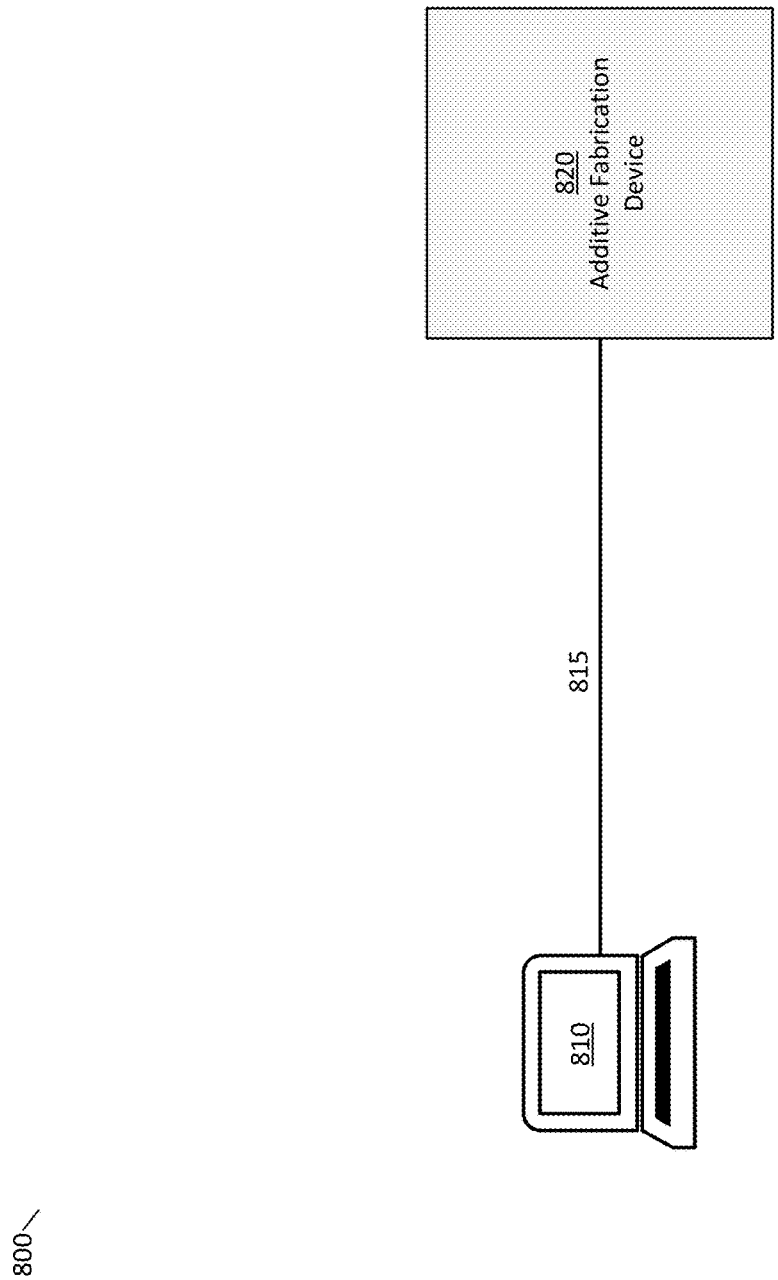
FIG. 8 illustrates an example of a computing system environment on which aspects of the invention may be implemented.

FIG. 8 is a block diagram of a system suitable for practicing aspects of the invention, according to some embodiments. System 800 illustrates a system suitable for generating instructions to perform additive fabrication by an additive fabrication device and subsequent operation of the additive fabrication device to fabricate an object. For instance, instructions to identify contamination on an optical window of an additive fabrication device or detect a failure mode of an additive fabrication process as described by the various techniques above may be generated by the system and provided to the additive fabrication device. Various parameters associated with identifying contamination on an optical window of an additive fabrication device or detecting a failure mode of an additive fabrication process may be stored by system computer system 810 and accessed when generating instructions for the additive fabrication device 820 to identify contamination or detect a failure mode.

According to some embodiments, computer system 810 may execute software that generates instructions for identifying contamination within an additive fabrication device. Said instructions may then be provided to an additive fabrication device, such as additive fabrication device 820, that, when executed by the device, performs a two-dimensional, optical scan of a calibration plate. Such instructions may be communicated via link 815, which may comprise any suitable wired and/or wireless communications connection. In some embodiments, a single housing holds the computing device 810 and additive fabrication device 820 such that the link 815 is an internal link connecting two modules within the housing of system 800.

Figure 9:
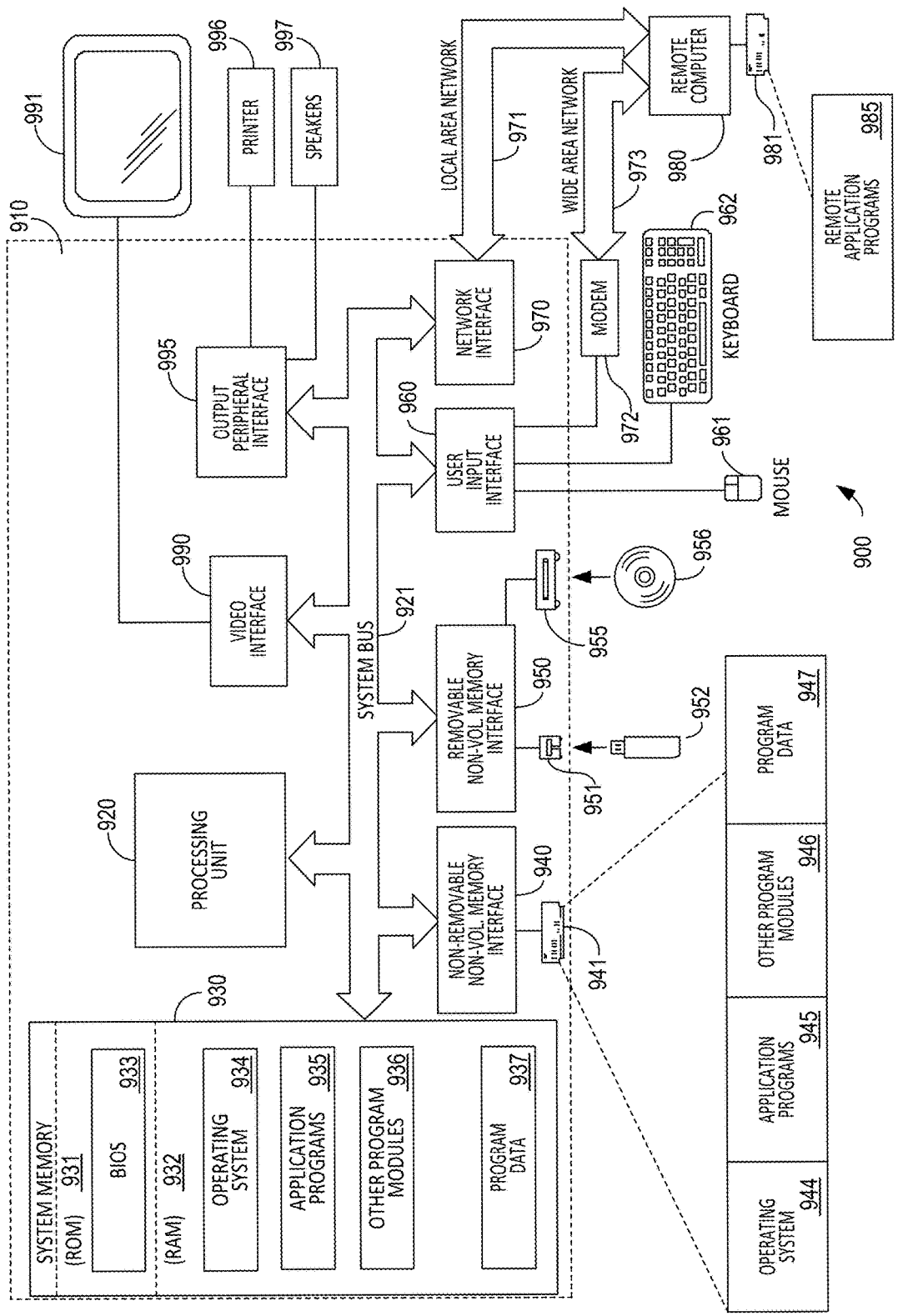
FIG. 9 is a block diagram of a system suitable for practicing aspects of the invention, according to some embodiments.

FIG. 9 illustrates an example of a suitable computing system environment 900 on which the technology described herein may be implemented. For example, computing environment 900 may form some or all of the computer system 810 shown in FIG. 8. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 8, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

As used herein, "light" may refer to any one of a number of wavelengths of radiation in the electromagnetic spectrum. Such wavelengths may correspond to, but are not limited to, both visible light and non-visible light such as infrared radiation, ultraviolet radiation, and X-rays.

As used herein, "contamination" may refer to any matter that is not part of the device's optical system that lies within the optical system and that may result from external sources of foreign matter. Such contamination may include, but is not limited to, stray photocurable resin, dust, oil (e.g., from fingerprints), or hair.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A device comprising:
   a container;
   a movable stage arranged below the container and configured to move in a first direction below the container, the movable stage comprising:
      an optical window;
      a light source below the optical window arranged to direct light towards the optical window; and
      at least one light sensor below the optical window arranged to receive light emitted by the light source and reflected through the optical window;
   at least one processor; and
   at least one computer readable medium comprising instructions that, when executed by the at least one processor:
      control the light source to direct light onto the optical window; and
      identify contamination on the optical window based at least in part on the light received by the at least one light sensor.

2. The device of claim 1, wherein the instructions, when executed by the at least one processor, further identify contamination on the optical window based at least in part on a known calibration pattern.

3. The device of claim 2, wherein the known calibration pattern comprises at least one light scattering area and at least one light absorbing area.

4. The device of claim 1, wherein the light source is a laser.

5. The device of claim 1, wherein the light sensor is a photodiode.

6. The device of claim 1, wherein identifying contamination on the optical window based at least in part on the light received by the at least one light sensor comprises:
   identifying contamination on the optical window based at least in part on a known calibration pattern;
   filtering out false indications of contamination based at least in part on the known calibration pattern; and
   categorizing contamination as scattering or absorptive based at least in part on the known calibration pattern.

7. The device of claim 1, wherein the instructions, when executed by the at least one processor, further move the movable stage along the first direction whilst operating at least one optical component to direct the light from the light source along a second direction perpendicular to the first direction, thereby scanning the light from the light source over a two-dimensional region.

8. The device of claim 1, wherein the instructions, when executed by the at least one processor, further operate at least one optical component to direct the light from the light source back and forth through a plurality of locations along the first direction and a second direction perpendicular to the first direction, thereby scanning the light over a two-dimensional area.

9. The device of claim 1, wherein the device is an additive fabrication device configured to form layers of solid material on a build surface by directing light through the optical window onto a liquid photopolymer.

10. The device of claim 9, wherein the additive fabrication device is configured to form the layers of solid material by directing light other than light from the light source through the optical window onto the liquid photopolymer.

* * * * *